United States Patent [19]
Kutschera et al.

[11] Patent Number: 5,789,332
[45] Date of Patent: Aug. 4, 1998

[54] FLUIDIZED BED GAS PHASE PROCESS OF PREPARING A SUPPORTED METALLOCENE CATALYST

[75] Inventors: Dirk Kutschera, Dortmund; Rainer Rieger, Bonn, both of Germany

[73] Assignee: Witco GmbH, Bergkamen, Germany

[21] Appl. No.: 701,239

[22] Filed: Aug. 22, 1996

[30] Foreign Application Priority Data

Sep. 13, 1995 [EP] European Pat. Off. ............ 95114344

[51] Int. Cl.$^6$ .................... B01J 31/00; B01J 37/00; C08F 4/02; C08F 4/60
[52] U.S. Cl. .............. 502/106; 502/104; 502/107; 502/111; 502/573; 502/103; 502/117; 526/160; 526/943
[58] Field of Search .................. 502/103, 104, 502/106, 111, 107, 117, 523

[56] References Cited

U.S. PATENT DOCUMENTS

| | | | |
|---|---|---|---|
| 2,477,019 | 7/1949 | Utterback et al. | 502/523 |
| 3,168,484 | 2/1965 | Engel et al. | 502/106 |
| 3,300,458 | 1/1967 | Manyik et al. | 502/111 |
| 3,884,832 | 5/1975 | Pullukat et al. | 502/106 |
| 4,082,692 | 4/1978 | Goldie | 502/106 |
| 4,427,573 | 1/1984 | Miles et al. | 502/111 |
| 4,921,825 | 5/1990 | Kioka et al. | 502/104 |
| 5,026,797 | 6/1991 | Takahashi | 502/117 |
| 5,086,025 | 2/1992 | Chang | 502/111 |
| 5,157,008 | 10/1992 | Sangokoya et al. | 502/111 |
| 5,206,401 | 4/1993 | Deavenport et al. | 556/175 |
| 5,234,878 | 8/1993 | Tsutsui et al. | 502/111 |
| 5,308,815 | 5/1994 | Sangokoya | 502/104 |
| 5,378,672 | 1/1995 | Shamshoum et al. | 502/523 |
| 5,534,474 | 7/1996 | Becker et al. | 502/111 |
| 5,721,184 | 2/1998 | Brinen et al. | 502/104 |

FOREIGN PATENT DOCUMENTS

| | | |
|---|---|---|
| 0 369 675 A1 | 5/1990 | European Pat. Off. |
| 0 442 725 A2 | 8/1991 | European Pat. Off. |
| 0 480 390 A2 | 4/1992 | European Pat. Off. |
| 0 560 128 A2 | 9/1993 | European Pat. Off. |
| 0 672 671 A1 | 9/1995 | European Pat. Off. |
| 50-15475 | 6/1975 | Japan ................. 502/523 |

OTHER PUBLICATIONS

Chien, James C.W. et al. "Olefin Copolymerization with Metallocene Catalysts", *Journal of Polymer Science Chemistry*, vol. 29, 1603–1607 (1991).

Walter Wagner Kamprath, Reihe Technik, Wärmeübertragung [Technical Series, Heat transfer], 2nd edition, Würzburg, Verlag Vogel, 1988, p. 143.

Dieter, Onkem, Leschonski, Grundzüge der Mechanischen Verfahrenstechnik [Principles of Mechanical Process Technology], first edition, Munich; Vienna: Verlag Hanser, 1986, pp. 40–47, 298–300.

Vauck, Müller, Grundoperationen Chemischer Verfahrenstechnik [Basic Operations of Chemical Process Technology], 8th edition, New York; Weinheim: VCH Verlagsgesellschaft mbH, p. 230.

W. Kaminsky, Nachr. Chem. Tech. Lab 29, 373–7 (1981).

W. Kaminsky et al., Makromol. Chem., Macromol. Symp. 3, 377–87 (1986).

*Primary Examiner*—Glenn Caldarola
*Assistant Examiner*—J. Pasterczyk
*Attorney, Agent, or Firm*—Scully, Scott, Murphy & Presser

[57] ABSTRACT

The present invention is directed to a gas phase process of preparing a supported metallocene catalyst wherein an alkylaluminum compound, water, a metallocene and, optionally, an olefin are metered into a fluidized bed reactor containing a fluidized bed of an inert support material in the presence of a gas stream.

10 Claims, 2 Drawing Sheets

FLUIDIZED BED GAS PHASE PROCESS OF PREPARING A SUPPORTED METALLOCENE CATALYST

BACKGROUND OF THE INVENTION

Metallocene catalyst systems are gaining importance as a new generation of catalyst systems for the preparation of polyolefins ("Single Site Catalysts"). These new catalysts essentially comprise, as already known from conventional Ziegler-Natta catalysis, a transition metal compound as the catalyst and a cocatalyst component, for example an alkylaluminoxane, in particular methylaluminoxane. Cyclopentadienyl, indenyl or fluorenyl derivatives of group IVa metals of the Periodic Table of the Elements are preferably employed as the transition metal compound. In contrast to conventional Ziegler-Natta catalysts, such systems not only have, in addition to a high activity and productivity, the capacity for targeted control of the product properties as a function of the components employed and the reaction conditions, but furthermore open up access to hitherto unknown polymer structures with promising properties with respect to industrial uses.

A large number of publications which relate to the preparation of specific polyolefins with such catalyst systems have appeared in the literature. A disadvantage in almost all cases, however, is the fact that a large excess of alkylaluminoxanes, based on the transition metal components, is necessary to achieve acceptable productivities (the ratio of aluminum in the form of the alkylaluminoxane to the transition metal is usually about 1000:1). Because of the high cost of the alkylaluminoxanes on the one hand and because of additional polymer working-up steps ("deashing steps") which are necessary in some cases on the other hand, polymer production on an industrial scale based on such catalyst systems would often be uneconomical. Furthermore, the solvent toluene which is often used for formulation of alkylaluminoxanes, in particular methylaluminoxane, is becoming increasingly undesirable for reasons of the storage stability of highly concentrated formulations (marked tendency of the aluminoxane solutions to form a gel) and for toxicological reasons in respect of the field of use of the polyolefin which finally result.

A significant reduction in the amount of alkylaluminoxane required with respect to the transition metal component can be achieved by applying the alkylaluminoxane to inert support materials, preferably $SiO_2$ (J. C. W. Chien, D. He, J. Polym. Science Part A, Polym. Chem., Volume 29, 1603–1607 (1991). Such supported materials furthermore have the advantage of being easy to separate off in the case of polymerizations in a condensed phase (preparation of highly pure polymers) and of being usable as free-flowing powders in modern gas phase processes, in which the particle morphology of the polymer can be determined directly by the particle form of the support. Alkylaluminoxanes fixed on a support are furthermore physically more stable, as dry powders, than solutions of comparable Al content. This applies in particular to methylaluminoxane, which, as already mentioned, tends to form a gel in solution in toluene after a certain storage time.

Metallocene catalyst systems, too, or precisely those formed from the aluminoxane with the metallocenes, are considerably more stable in supported form than in solution.

Some possibilities for fixing alkylaluminoxanes to supports are already described in the literature:

EP-A-0 369 675 (Exxon Chemical) describes a process in which immobilization of alkylaluminoxanes by reaction of an approximately 10% strength solution of trialkylaluminum in heptane with hydrated silica (8.7% by weight of $H_2O$) is achieved.

In EP-A-0 442 725 (Mitsui Petrochemical), the immobilization is effected by reaction of a toluene/water emulsion with an approximately 7% strength solution of trialkylaluminum in toluene in the presence of silica at temperature of −50° C. to +80° C.

U.S. Pat. No. 5,026,797 (Mitsubishi Petrochemical) opens up another alternative by reaction of already pre-prepared alkylaluminoxane solutions with silica (predried at 600° C.) at 60° C. and subsequent washing out of the non-immobilized alkylaluminoxane content with toluene.

Finally, U.S. Pat. No. 4,921,825 (Mitsui Petrochemical) describes a process for immobilizing alkylaluminoxane by precipitation from solutions in toluene by means of n-decane in the presence of silica.

Some of these processes are technically involved, since, inter alia, they include low reaction temperatures at the start or multi-stage working-up processes and, as a result, losses in yield in respect of the amount of aluminum employed in the form of aluminum trialkyls. Furthermore, the space/time yield is sometimes impaired considerably by the obligatory use of relatively large amounts of solvent.

Finally, the metallocene must also subsequently be fixed to the support in order to obtain an active polymerization catalyst. A further reaction step in a solvent is therefore necessary. As a result, the profitability of these systems is jeopardized once more.

Several possibilities likewise exist for fixing the metallocenes to the support.

Thus, on the one hand, the metallocene can be brought into contact from solution with the suspended supported aluminoxane, or the metallocene can first be reacted with the aluminoxane and the reaction product can subsequently be applied to the inert support. With both methods, the working-up steps are not trivial, since the success of the application to the support and the activity of the finished catalyst depend decisively on the reaction temperatures and the drying conditions (cf. EP-A 0 560 128, U.S. Pat. No. 5,308,815).

An object of the present invention is therefore to overcome these disadvantages of the prior art and to provide an economical process by means of which active catalysts for olefin polymerization comprising alkylaluminoxanes and metallocenes can be fixed to inert support materials in one process step, largely without the co-use of organic solvents, in a high yield and homogeneity and in a reproducible manner, the particle morphology of the support being retained and the products finally being in the form of free-flowing powders.

According to EP-A 0 672 671, it has been found that some of the disadvantages mentioned above can be eliminated by carrying out the synthesis of alkylaluminoxanes, in particular methylaluminoxanes (MAO) and fixing thereof to inert supports directly via the gas phase without any use of solvents and without additional processing steps.

BRIEF SUMMARY OF THE INVENTION

It has now been found that, here too, the metallocene can be supported simultaneously and together with or after the aluminoxane by varying the geometry of the fluidized bed. In a batchwise procedure, prepolymerization in a subsequent step is also possible, so that the end product is available immediately for the polymerization.

The resulting end products are free-flowing powders which can be employed directly as highly active catalysts for olefin polymerization. The particle morphology is changed not adversely but instead positively within the process. Small amounts of fine contents of the support material on the one hand are built up within the fluidized bed by the application to the support, and on the other hand extremely small contents can also be removed. By using a circulating fluidized bed, discharge of the product oriented to particle size is also possible by controlled variation of the gas streams.

The present invention thus relates to a process for the preparation of a metallocene catalyst system, fixed to inert support material, from one or more alkylaluminum compounds, water and metallocenes, which is characterized in that the reactants are metered into a fluidized bed reactor with the gas stream and, after the reaction, are immediately fixed or applied to the support from the gas phase.

The invention furthermore relates to a process for the preparation of a metallocene catalyst system, fixed on inert support material, from one or more alkylaluminum compounds, water and metallocenes, which is characterized in that the supported catalyst prepared by the above process is preferably converted into a prepolymer without prior isolation by metering an olefin into the fluidized bed.

The invention furthermore relates to metallocene catalyst systems which are fixed on support material and are prepared by the process according to the invention.

Further subject matter of the invention is characterized by the claims.

DETAILED DESCRIPTION OF THE INVENTION

Figure 1:
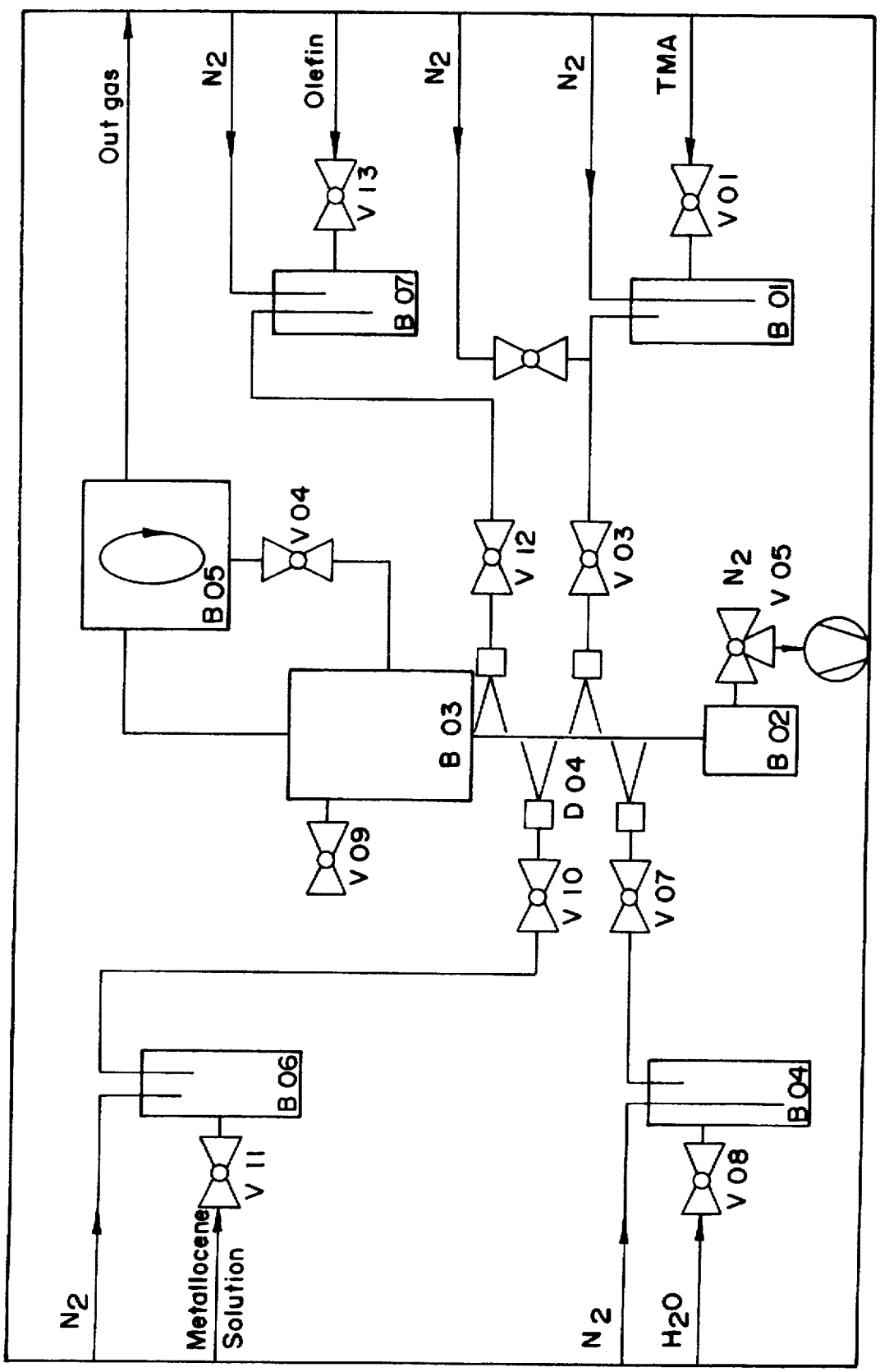
FIGS. 1 and 2 are schematic flowsheets showing two embodiments of the present invention.

The preparation is carried out by generally known fluidized bed processes. "Fluidized bed" is understood as meaning a fine-particle layer of solid which is loosened by a fluid flowing through it to the extent that the particles can change position over a certain distance (Walter Wagner Kamprath, Reihe Technik. Wämeübertrag [Technical Series, Heat transfer], 2nd edition, Würzburg, Verlag Vogel, 1988, Page 143).

A distinction is made here between a stationary and circulating fluidized bed (Dieter, Onken, Leschonski, Grundzüge der Mechanischen Verfahrenstechnik [Principles of Mechanical Process Technology], first edition, Munich; Vienna: Verlag Hanser, 1986, Pages 40–47, 298–300).

In the process according to the invention, the fluidized bed is maintained by means of a continuous stream of inert gas. The pressure within the reactor can be chosen within wide ranges and depends on requirements. Pressure between $10^4$–$10^6$ Pa are preferred according to the invention.

In fluidized bed reactors, particles of solid are swirled up by an ascending stream of gas. The solid here can serve as the catalyst or as a reactant (Vauck, Müller, Grundoperationen Chemischer Verfahrenstechnik [Basic Operations of Chemical Process Technology], 8th edition, New York; Weinheim: VCH Verlagsgesellschaft mbH, Page 230).

The particles of solid and the gas phase can be exchanged continuously during operation.

The alkanes obtained as reaction products can furthermore serve to maintain the fluidized bed if they are in gaseous form under the given reaction conditions. The reactants trialkylaluminum, in particular trimethyaluminum (TMA), and water, as well as the metallocene solution, can be metered into the fluidized bed reactor via the gas streams used. Both the desired methyl/aluminum ratio of the alkylaluminoxane and the degree of loading of the support can be controlled systematically by regulating the particular gas streams. In the case of support materials suitable for this, such as, for example, $SiO_2$, the reactant water can furthermore be introduced in a form bonded to the surface of the support.

Direct feeding of trialkylaluminum, in particular trimethylaluminum (TMA), and water into the gas phase (the gas stream here serving solely to maintain the fluidized bed) and continuous operation of the unit are also possible. In all cases, the original particle morphology of the support is retained.

During the supporting operation in the gas phase, the solvent of the metallocene is replaced and can be separated off in a subsequent separator device. The end product is therefore free from solvent content.

The molar ratio of water to alkylaluminum compounds for preparation of the aluminoxanes can be in the range from 0.5:1 to 1.5:1, preferably 0.7:1 to 1.3:1.

The metallocene catalysts are prepared by metering the metallocene solution according to the requirements imposed on the catalyst system. Between 0.1 and 30% by weight of metallocene, which is introduced into the fluidized bed in the form of its solution, preferably between 0.5 and 15% can be supported.

The molar ratio of $H_2O$/aluminum trialkyl, in particular also in the case of TMA, can be adjusted to the desired value. This is of particular importance, since the polymerization activity of aluminoxanes as a cocatalyst in olefin polymerization evidently can depend on the content of free aluminum trialkyl. Since the methylaluminoxane is a supported solid, determination of a degree of oligomerization is not trivial; the application to the support is an application of a solid to the support, in which the methylaluminoxane is precipitated and fixed as a pseudocrystalline or amorphous solid.

Determination of a degree of oligomerization or of the molecular weight of the aluminoxane in the supported system is therefore no longer possible by classical methods (Literature: W. Kaminsky, Nachr. Chem. Tech. Lab. 29, 373–7 (1981); W. Kaminsky et al., Makromol. Chem., Macromol. Symp. 3, 377–87 (1986)).

It can be ensured by immobilization studies that contents which can be detached from the support materials and which, in the case of polymerization in solutions, can lead to problems due to reactor fouling (copolymerization homogeneously/heterogeneously due to the soluble contents) are no longer present.

Organoaluminum compounds which can be used are in principle all the compounds customary in this field which can be hydrolyzed with water to give aluminoxanes. Compounds which are preferred according to the invention are trialkylaluminum compounds $(R)_3Al$ with short-chain alkyl radicals having 1–10 C atoms, in particular 1–5 C atoms, such as the methyl, ethyl, propyl, isopropyl, butyl, isobutyl, tert-butyl or pentyl radicals. Trimethylaluminum is preferred according to the invention.

In addition to these compounds, other co-catalysts can also be co-used according to the invention, such as, in particular organoboron compounds, such as, for example tris|pentafluorophenyl| boron, triphenylcarbonium tetrakis

|pentafluorophenyl| borate and N,N-dimethylanilinium tetrakis |pentafluorophenyl|borate.

All compounds which are used in metallocene-catalyzed polymerization are available as the metallocene component, such as, for example, bridged or nonbridged metallocene sandwich complexes and corresponding semi-sandwich complexes.

These compounds which can be co-used according to the invention and their preparation and use are described in detail in EP-A 0 480 390, EP-A 0 413 326, EP-A 0 530 908, EP-A 0 344 887, EP-A 0 420 436, EP-A 0 416 815 and EP-A 0 520 732.

All olefins which can be used for preparation of the active catalyst compound or which are used in the polymerization can be used as the prepolymer olefin. These include, in particular, alpha-olefins, for example ethene, 1-propene and 1-hexene.

Support materials which can be used according to the invention and are employed are the porous oxides of one or more of the elements of main groups II, III or IV and of sub-group II and IV of the Periodic Table, such as $ZrO_2$, $TiO_2$, $B_2O_3$, CaO, ZnO, BaO and, preferably, $Al_2O_3$ and MgO, and in particular $SiO_2$.

These support materials can have particle sizes in the range of 1–300 μm, preferably 10–200 μm; surfaces of 10–1,000 $m^2$/g, in particular 100–500 $m^2$/g; and $N_2$ pore volumes of 0.5–3 $cm^3$/g.

These supports are commercially available materials which have the values stated in random distribution.

The water content of the support materials can vary between about 0 to 15% by weight, depending on the procedure. The desired water contents can be established by the generally known hydration processes or calcining processes on commercially available support materials.

The ratio of support to aluminoxane can be varied within relatively wide limits. If desired, support-free aluminoxane (aluminum content theoretically not more than 46.5% by weight) can be prepared with the process according to the invention. Conditions are preferably chosen according to the invention such that 3–40% by weight of aluminum, preferably 5–30% by weight of aluminum, is present in the form of aluminoxanes on the resulting free-flowing powder of support material and aluminoxane.

The metallocene component is introduced in a manner such that an aluminum-metallocene ratio (based on the ME=metallocene central atom) resulting in the formation of a highly active catalyst is established. This mole ratio of Al:ME is typically 5,000:1 to 10:1, in particular 500:1 to 50:1.

For this, after formation of the aluminoxane in the fluidized bed, a solution of the metallocene in an inert solvent is metered into the fluidized bed by a nozzle in a manner such that the metallocenium catalyst system formed can form on the support material or is first deposited on the support as a complete system.

Supported metallocenium catalysts which also meet the requirements of heterogeneous copolymerizations can be prepared by suitable combination of one or more metering nozzles and the use of one- or multi-component systems of the reactants.

The prepolymerization is carried out as a function of time by metering in the olefin according to the needs of the subsequent polymerization.

For this, after supporting of the aluminoxane or of the metallocenium catalyst system, the monomeric olefin can be introduced into the gas stream of the fluidized bed via a nozzle and thus form the prepolymer. The same volume streams which are also used for the supporting of the aluminoxane component are used here.

The process according to the invention allows the preparation of supported metallocene catalyst systems with virtually quantitative yields of immobilized aluminum and metallocene, based on the components employed. Because the process conditions can be adjusted in a controlled manner and are reproducible, these supported metallocene catalyst systems prepared by the process according to the invention have high activities and are therefore outstandingly suitable for olefin polymerization.

By simple combination with a prepolymerization in the same procedure and unit, the preparation of prepolymers which can be employed directly for some polymerization processes is also possible.

The supported catalyst systems and prepolymers prepared by the process according to the invention can be employed without problems in the known olefin polymerization processes, such as, for example, also WO 94/14856 or U.S. Pat. No. 5,086,025 or U.S. Pat. No. 5,234,878.

The process according to the invention is illustrated in the following with the aid of examples. The values for the process variables—temperature, pressure and volume streams—stated in the examples are values averaged over the entire experimental procedure. The experiments were carried out such that these mean values were within the preferred range.

The process parameters can be used within the stated minima and maxima to vary or optimize products.

General information on the reaction parameters for carrying out the process according to the invention The examples relate to a unit with a fluidized bed capacity of about 1,000 ml and can be extrapolated in relation to scale as necessary.

| Weight of support: | maximum | 300.0 g |
|---|---|---|
| | minimum | 50.0 g |
| | preferred range | 150.0–250.0 g |
| Temperature: | minimum | 2° C. |
| | maximum | 90° C. |
| | preferred range | 20° C.–60° C. |
| Delta T during | minimum | 10° C. |
| the reaction | maximum | 30° C. |
| | preferred range | 20° C.–25° C. |
| Pressure: | | |

Pressure variations result from the nature of the fluidized bed and the degree of loading.

| | minimum | 50 hPa |
|---|---|---|
| | maximum | 2,000 hPa |
| | preferred range | 100–150 hPa |
| Volume streams: | maximum | 13 l/min. |
| formation of the | minimum | 6 l/min. |
| fluidized bed | preferred range | 8 l/min.–10 l/min. |
| Formation of the | maximum | 20 l/min. |
| circulating | minimum | 14 l/min. |
| fluidized bed: | preferred range | 16 l/min.–18 l/min. |
| loaded with TMA: | maximum | 1 l/min. |
| | minimum | 0.2 l/min. |
| | preferred range | 0.3 l/min.–0.8 l/min. |
| loaded with $H_2O$: | maximum | 1 l/min. |
| | minimum | 0.2 l/min. |
| | preferred range | 0.3 l/min.–0.8 l/min. |
| loaded with | maximum | 1 l/min. |
| metallocene | minimum | 0.2 l/min. |
| solution: | preferred | 0.3 l/min.–0.8 l/min. |

7
-continued

| | range | |
|---|---|---|
| loaded with | maximum | 1 l/min. |
| olefin: | minimum | 0.2 l/min. |
| | preferred range | 0.3 l/min.–0.8 l/min. |

Volume stream ratio for recycling of waste gas:

| V N$_2$ (new) | maximum | 0.5 |
|---|---|---|
| — | minimum | 0.05 |
| V (waste gas) | preferred range | 0.1–0.3 |
| Reaction time: | minimum | 20 min. |
| | maximum | 600 min. |
| | preferred range | 100 min.–500 min. |

EXAMPLES

Example 1

This Example utilized simultaneous metering via separate gas streams employing the flowsheet depicted in FIG. 1, to which reference is made..

All the valves were closed in the starting position. The solid was initially introduced into reaction tank B 03 via valve V 09. To form a fluidized bed in reactor B 05, valve V 05 was opened and N$_2$ was fed in. The solid deposited was fed back to reaction tank B 03 via valve V 04.

Trimethylaluminum (TMA) was added to the metering tank B 01 via valve V 01 and H$_2$O was added to the metering tank B 04 via valve V 08.

An inert gas stream loaded with TMA was first passed into the reaction tank B 03 via valve V 03. When the fluidized bed in reactor B 05 had stabilized, a second inert gas stream loaded with H$_2$O was fed to tank B 03 via valve V 07.

To meter in the metallocene solution, the metallocene solution was initially introduced into tank B 06 through valve V 11 and, by opening the valve V 10, the metallocene solution was introduced through the nozzle D 04 into the fluidized bed region in B 05. It was possible for the metering to be carried out simultaneously with the metering of TMA/water but metering could also be carried out after the aluminoxane had been applied to the support.

After the reaction time, the TMA and H$_2$O addition was stopped by closing the valves V 07 and V 03. The fluidized bed in B 05 was interrupted via valve V 05 and the product fell into tank B 02.

To meter in olefin for the prepolymerization, after the aluminoxane and metallocene had been supported, the olefin was introduced into tank B 07 via valve V 13 and metered via valve V 12 into the fluidized bed in reactor B 05.

| Reaction parameters | |
|---|---|
| Support: | Surface N$_2$-BET = 316 m$^2$/g; particle size distribution = 10–100 μm; N$_2$ pore volume = 1.55 ml/g |
| Weight of support: | 75.0 g |
| Reactor volume: | 2 l |
| Volume stream of N$_2$ (formation of the fluidized bed): | 8.31 l/min. |
| Volume stream of N$_2$ (loaded with TMA): | 0.51 l/min. |
| Volume stream of N$_2$ (loaded with H$_2$O): | 0.51 l/min. |
| Reaction time: | 90 min. |
| Reaction temperature: | min. 28° C. max. 34° C. |
| Pressure: | about 1 bar |

The resulting product had an Al content of 21.1% (w/w) and a methyl/Al mole ratio of 0.99. Yield: 111 g=97.7%.

Example 2

The experimental procedure was analogous to Example 1 with the modification that 100 g of a support were employed and the reaction time was 225 minutes.

8

The Al content of the product was 14.5% (w/w) and the methyl/Al mole ratio was 1.06. Yield: 127 g=94%.

Example 3

(Reactant H$_2$O on the support in adsorbed form)

The experimental procedure was analogous to Example 1, with the modification that 19 g of hydrated support with 2.6% by weight of water were added. Since no additional H$_2$O was therefore to be metered in, valve V 07 remained closed over the entire period of the experiment.

After the reaction time of 30 minutes, the product had an Al content of 2.6% (w/w) and a methyl/Al mole ratio of 0.98.

Example 4

Figure 2:
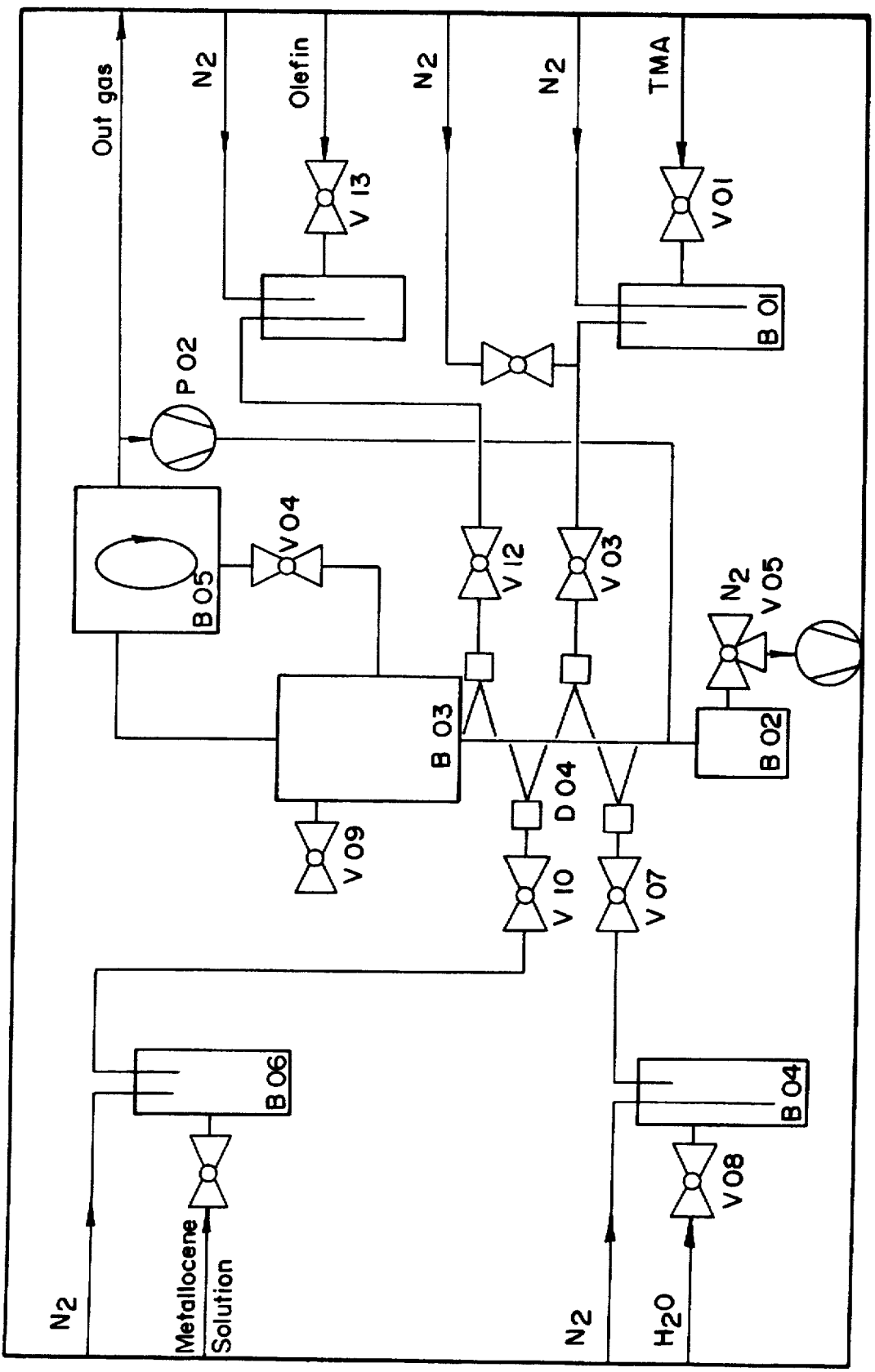

This example employed recycling of the waste gases using the flowsheet depicted in FIG. 2, to which reference is made.

All the valves were closed in the starting position. The solid was initially introduced into reaction tank B 03 via valve V 09. To form a fluidized bed in reactor B 05, valve V 05 was opened and N$_2$ was fed in. The solid deposited was fed back to tank B 03 by a valve V 04.

TMA was added to the metering tank B 01 via valve V 01 and H$_2$O was added to the metering tank B 04 via valve V 08.

An inert gas stream loaded with TMA was first passed into the reaction tank B 03 via valve V 03. When the fluidized bed in reactor B 05 had stabilized, a second inert gas stream loaded with H$_2$O was fed to tank B 03 via valve V 07.

The compressor P 02 for recycling the waste gases was switched on and at the same time the volume stream of N$_2$ for formation of the fluidized bed was reduced. After the reaction time, the compressor P 02 was switched off and the TMA and H$_2$O addition was stopped by closing valves V 07 and V 03. The fluidized bed was interrupted via valve V 05 and the product fell into tank B 02.

The reaction parameters were analogous to Example 1 with the following exceptions:

| Weight of support: | 75.0 g |
|---|---|
| Volume stream N$_2$ (formation of the fluidized bed) | 17.2 l/min. |
| Volume stream ratio (V N$_2$ (new)/V (waste gas)): | 0.2 |

The Al content of the product was 10.2% (w/w) and the methyl/Al mole ratio was 0.86. Yield: 88 g=94%.

Example 5

Application of Metallocene to the Support

| Weight of MAO/SiO$_2$ from Example 1: | 75 g |
|---|---|
| Weight of metallocene (=bis |n-butylcyclopentadienyl| zirconium dichloride | 12.13 g |
| Solvent = toluene | 110 ml |
| Volume stream of N$_2$ | 10.2 l/min. |

Referring to FIG. 2, the product from Example 1 was introduced into tank B 03 via valve V 09 and the fluidized bed was built up by opening valve V 05. After the fluidized bed in reactor B 05 had stabilized, the metallocene solution was metered via valve V 10 through the nozzle D 04 into the fluidized bed. By integration of a cold trap in the waste gas stream between reactor B 05 and compressor P 02, it was possible for all of the solvent to be separated off.

The duration of the experiment was 260 minutes.

The product was obtained in the form of free-flowing powder with an Al content of 18.2% (w/w) and a zirconium content of 3.05% (w/w). The yield was 94%.

Example 6

Polymerization

Referring to FIG. 2, some of the product from Example 5 (75 g) was introduced into tank B 03 via valve V 09 and the fluidized bed was built up by opening valve V 05. A volume stream of 0.5 l/min. of ethene was metered in by opening valves V 12 and V 13 (after the fluidized bed in reactor B 05 had stabilized). After 4 minutes, the metering of olefin was interrupted and the reactants were left in the fluidized bed for a further 10 minutes, with recycling of the gas.

The product was isolated almost quantitatively and showed a weight increase of 3.1%.

Example 7

Continuous Procedure

The reaction was carried out in accordance with the parameters stated in Example 4, with the modification that in addition to the metering of TMA/water via valve V 03/tank B 01 and valve V 07/tank B 04, the valve V 10 and tank B 06 were now also used in order to meter in the metallocene solution. When the metering had ended, valves V 03/V 07 and V 10 were closed, and the material was left in the fluidized bed for a further 10 minutes in order to separate off the solvent. By integration of a cold trap in the waste gas stream between reactor B 05 and compressor P 02, it was possible for all of the solvent to be separated off.

Valves V 12 and V 13 were then opened and a volume stream of 0.5 l/min. of ethene was metered in. After 4 minutes, the metering of ethene was interrupted by closing valve V 12 and the reactants were left in the fluidized bed for a further 10 minutes, with recycling of the gas. The product was obtained almost quantitatively as a free-flowing powder.

The yield was 83.5 g, the Al content was 17.4% (w/w) and the zirconium content was 2.91% (w/w).

What is claimed is:

1. A process for the preparation of a metallocene catalyst composition immobilized on an inert support material from reactants including one or more alkylaluminum compounds, water and metallocenes, comprising establishing a fluidized bed wherein solids including said support material are fluidized in a fluidized bed reactor with a fluidizing gas stream, and metering the reactants into said fluidized bed reactor with the gas stream whereupon said reactants react with each other, and after reaction, are fixed to the inert support material from the gas phase.

2. A process according to claim 1 wherein the reactants, solutions thereof or an inert gas stream loaded with the reactants are metered directly into the reactor.

3. A process according to claim 1 wherein the molar ratio of water: alkylaluminum compounds is in the range from 0.5:1 to 1.5:1.

4. A process according to claim 1 wherein said one or more alkylaluminum compounds comprises trimethylaluminum.

5. A process according to claim 1, wherein the support material is selected from the group consisting of $Al_2O_3$, MgO and $SiO_2$ with particle sizes of 1–300 μm, surface areas of 10–1,000 $m^2$/g, pore volumes of 0.5–3 $cm^3$, and water contents of 0–15% by weight.

6. A process for the preparation of a metallocene catalyst composition immobilized on an inert support material from reactants including one or more alkylaluminum compounds, water and metallocenes, comprising establishing a fluidized bed wherein solids including said support material are fluidized in a fluidized bed reactor with a fluidizing gas stream, and metering the reactants into said fluidized bed reactor with the gas stream whereupon said reactants react with each other, and are fixed to the inert support material from the gas phase during the reaction, and then converting the reaction product thereof into a prepolymer without prior isolation by metering an olefin into the fluidized bed reactor.

7. A process according to claim 6 wherein the support material is selected from the group consisting of $Al_2O_3$, MgO and $SO_2$ with particle sizes of 1–300 μm, surface areas of 10–1,000 $m^2$/g, pore volumes of 0.5–3 $cm^3$, and water contents of 0–15% by weight.

8. A process according to claim 6 wherein the reactants, solutions thereof or an inert gas stream loaded with the reactants are metered directly into the reactor.

9. A process according to claim 6 wherein the molar ratio of water: alkylaluminum compounds is in the range from 0.5:1 to 1.5:1.

10. A process according to claim 6 wherein said one or more alkylaluminum compounds comprises trimethylaluminum.

* * * * *

UNITED STATES PATENT AND TRADEMARK OFFICE
CERTIFICATE OF CORRECTION

PATENT NO.   : 5,789,332
DATED        : August 4, 1998
INVENTOR(S)  : D. Kutschera, et al.

Page 1 of 1

It is certified that error appears in the above-identified patent and that said Letters Patent is hereby corrected as shown below:

<u>Title Page</u>, [56] References Cited, FOREIGN PATENT DOCUMENTS: Insert
--0 344 887 A2 12/1989 European Pat. Off..
0 420 436 A1 4/1991 European Pat. Off..
0 520 732 A1 12/1992 European Pat. Off..
0 530 908 A1 3/1993 European Pat. Off..
WO 94/14856 7/1994 European Pat. Off..

<u>Column 7</u>,
Line 20: "made.." should read --made.--

<u>Column 10</u>,
Line 36, Claim 7: "SO$_2$" should read --SiO$_2$--

Signed and Sealed this

Twenty-fourth Day of July, 2001

Attest:

*Attesting Officer*

NICHOLAS P. GODICI
*Acting Director of the United States Patent and Trademark Office*